(12) United States Patent
Barja

(10) Patent No.: US 8,678,335 B2
(45) Date of Patent: Mar. 25, 2014

(54) CASTER STOP AND METHOD

(76) Inventor: John Barja, Charlotte, NC (US)

( * ) Notice: Subject to any disclaimer, the term of this patent is extended or adjusted under 35 U.S.C. 154(b) by 13 days.

(21) Appl. No.: 13/506,627

(22) Filed: May 3, 2012

(65) Prior Publication Data
US 2013/0292535 A1 Nov. 7, 2013

(51) Int. Cl.
*A47B 91/12* (2006.01)

(52) U.S. Cl.
USPC ............................... 248/346.11; 248/188.9

(58) Field of Classification Search
USPC ............... 248/246.11, 188.2, 188.7, 188.9, 248/346.11; 188/19, 31, 32; D12/217
See application file for complete search history.

(56) References Cited

U.S. PATENT DOCUMENTS

| | | | |
|---|---|---|---|
| D44,952 S | 12/1913 | Buser | |
| 1,480,758 A * | 1/1924 | Hight | 248/346.11 |
| 1,572,817 A * | 2/1926 | Shaffer et al. | 270/39.08 |
| 2,787,085 A * | 4/1957 | Auer | 248/346.11 |
| 4,752,056 A * | 6/1988 | Culbertson | 248/188.9 |
| 5,046,587 A * | 9/1991 | Jones | 188/32 |
| 5,210,903 A | 5/1993 | Horning | |
| 5,383,639 A * | 1/1995 | Byard | 248/346.11 |
| D440,483 S | 4/2001 | Bushey | |
| D444,441 S * | 7/2001 | Bennett, Jr. | D12/217 |
| 7,000,740 B2 * | 2/2006 | Chrisco et al. | 188/32 |

OTHER PUBLICATIONS

POSI-SET Appliance Locating Device product specifications, one page, Apr. 23, 2010.

* cited by examiner

*Primary Examiner* — Tan Le
(74) *Attorney, Agent, or Firm* — Timothy R. Kroboth

(57) ABSTRACT

The present invention is directed to a caster stop. Advantageously, the caster stop has a generally circular shape, and includes a concave portion for receiving a caster wheel, and a ramp that spans between a circumferential rim and a generally circular foot. The ramp facilitates wheel movement in-and-out of the concave portion of the caster stop. Also provided is an inventive method that does not require lifting caster-mounted equipment either to position caster wheels in caster stops or to displace caster-mounted equipment from caster stops. Instead, exerting a pushing force on caster-mounted equipment is sufficient for in-and-out movement. This invention is especially useful for caster-mounted cooking equipment in commercial kitchens.

15 Claims, 2 Drawing Sheets

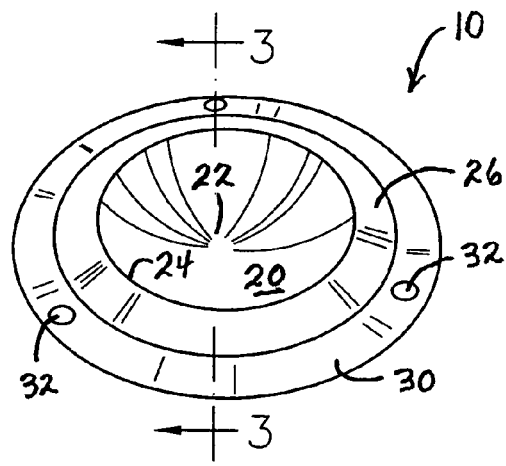
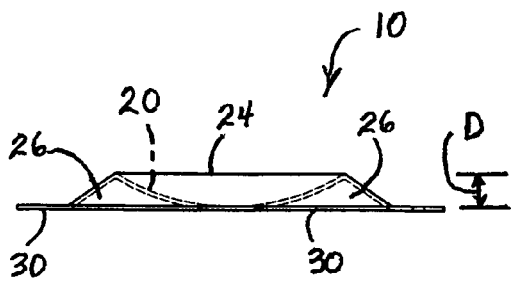
FIG. 1  FIG. 2
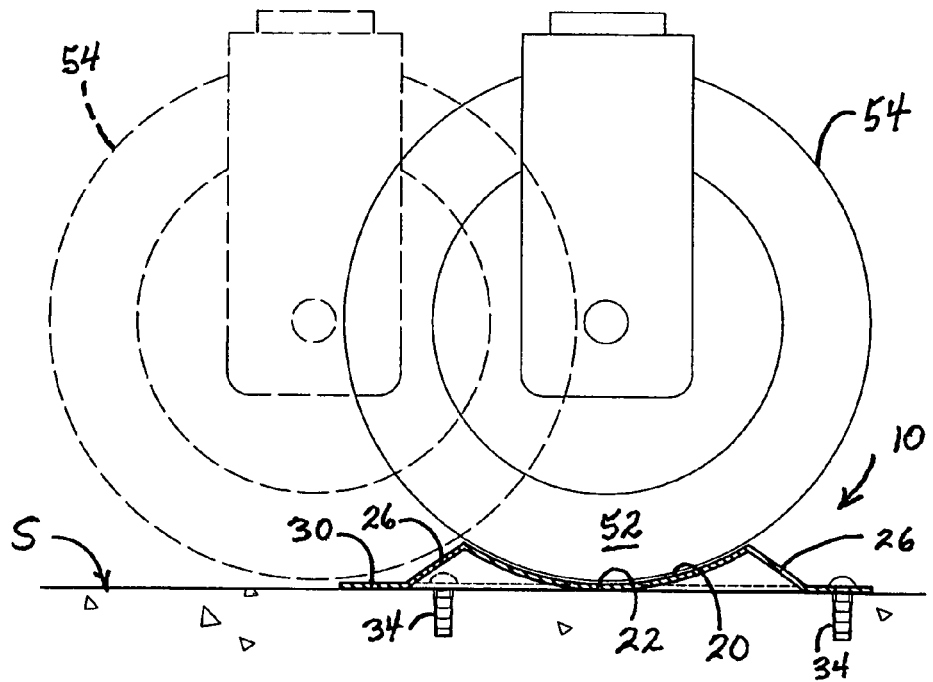
FIG. 3

CASTER STOP AND METHOD

FIELD OF THE INVENTION

This invention relates to ensuring proper and secure placement of caster-mounted equipment.

BACKGROUND OF THE INVENTION

Certain commercial environments such as kitchens, are subject to requirements governing positioning and sanitation of equipment. In the case of commercial kitchens, for compliance with the National Fire Protection Association (NFPA) code, it is necessary to ensure proper placement of mobile kitchen cooking equipment such as griddles, fryers and charbroilers, under exhaust hoods and associated fire suppression nozzles. For example, NFPA 17A 5.6.4 (2002 Edition) states, "Moveable cooking equipment shall be provided with a means to ensure that it is correctly positioned in relation to the appliance discharge nozzle during cooking operations." Furthermore, after having been moved for cleaning or any other operational reason, moveable cooking equipment must be returned to an approved design location. For instance, NFPA 96 12.1.2.3.1 (2001 Edition) states, "An approved method shall be provided that will ensure that the appliance is returned to an approved design location."

Until recently, the use of locking casters on caster-mounted, commercial cooking equipment, was generally considered to satisfy NFPA 17A 5.6.4. However, many reviewing agencies no longer consider the use of locking casters to be in compliance with the NFPA code. In view thereof, recent attempts to meet the NFPA code have included mounting angle iron rails on the floor. However, angle iron rails are difficult to roll the equipment over and difficult to keep clean. Furthermore, the use of angle iron rails may not ensure proper left to right placement of equipment, and thus may not be in compliance with the NFPA code.

Accordingly, there is a need for a caster stop and method that would allow caster-mounted equipment, in particular commercial cooking equipment, to be securely retained in place, yet easily moved. Beneficially, in accordance with the NFPA code, a caster stop would securely maintain commercial cooking equipment in an approved design location, yet provide for easy equipment movement and return to an approved design location. Advantageously, the caster stop would be easily cleaned.

SUMMARY OF THE INVENTION

The present invention is directed to a surface mountable, caster stop useful in a variety of commercial environments, in particular commercial kitchens. Beneficially, the inventive caster stop has a generally circular shape, and includes a concave portion for receiving a caster wheel. Advantageously, the concave portion includes a central portion for load-bearing contact with a support surface, and extends upwardly from the central portion to a circumferential rim.

The inventive caster stop beneficially further includes a generally circular flange that slopes downwardly from the circumferential rim, and that bridges between the circumferential rim and a generally circular foot of the caster stop. The generally circular flange is a ramp that facilitates wheel movement in-and-out of the concave portion of the caster stop.

Also provided is a method of maintaining proper and secure placement of caster-mounted apparatus. In accordance with the inventive method, typically a pair of the inventive caster stops are mounted on a support surface in an appropriately spaced apart relationship, and in an appropriate location. Beneficially, without lifting the caster-mounted apparatus as required by prior art caster stops such as that of U.S. Pat. No. 5,210,903, or without having to overcome the difficulty of rolling caster-mounted equipment over angle iron rails or the like, two wheels (when only two caster stops are used) of the casters of caster-mounted apparatus are rolled onto the ramps of the caster stops and into the concave portions of the caster stops. Thereafter, the apparatus may be immobilized by, for example, locking the locking casters of an apparatus provided with locking casters.

Similarly, to move the caster-mounted apparatus for cleaning or any other operational reason, the locking casters are unlocked, and by exerting a pushing force on the apparatus, the wheels disposed in the caster stops are rolled out of the caster stops.

Additional advantages and beneficial features of the present invention are set forth in the drawing and detailed description, and in part will become apparent to those skilled in the art upon examination of the drawing and detailed description or may be learned by practice of the invention. As will be realized, this invention is capable of other and different embodiments than those described, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference now is made to the accompanying drawing which forms a part of the specification of the present invention.

FIG. 1 is a perspective view of a preferred caster stop in accordance with the present invention;

FIG. 2 is an end view of the caster stop of FIG. 1;

FIG. 3 is an enlarged cross-sectional view taken substantially along the line 3-3 of FIG. 1, illustrating movement of a caster wheel into or out of the caster stop of FIG. 1.

DETAILED DESCRIPTION OF THE INVENTION

Figure 4:
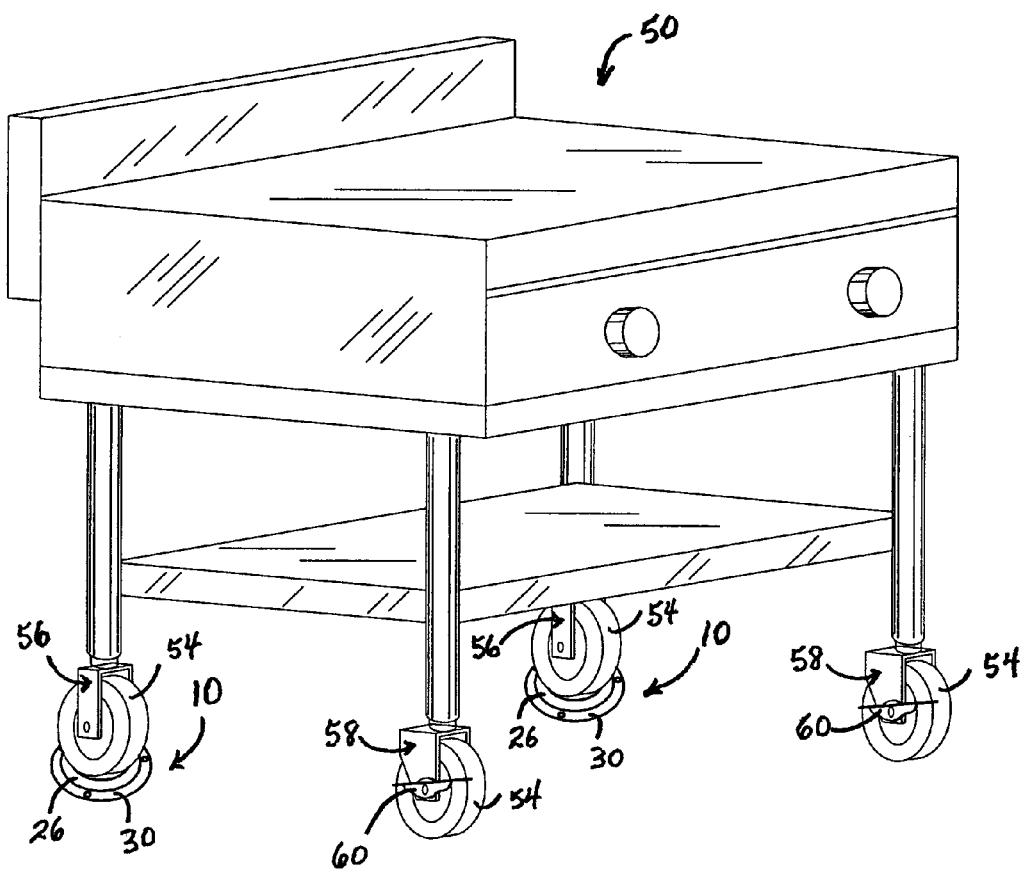
FIG. 4 is a perspective view of caster-mounted equipment secured in place using a pair of the caster stops of FIG. 1 and locking casters.

The present invention relates to proper and secure placement of moveable equipment, in particular of caster-mounted equipment, and may be beneficially used in a wide variety of commercial settings. Although particularly described with reference to commercial kitchens, it will be readily understood that the applicability of the invention extends to other commercial environments that utilize caster-mounted equipment.

With reference to FIGS. 1-3, a surface mountable, caster stop 10 in accordance with the present invention, beneficially has a generally circular shape. Advantages of a generally circular shape include allowing caster stop 10 to be approached from any direction by caster-mounted apparatus.

Advantageously, caster stop 10 includes a concave portion 20 for receiving a caster wheel, and concave portion 20 includes a central portion 22 for load-bearing contact with a support surface (indicated by "S" in FIG. 3), typically a floor. Beneficially, concave portion 20 is generally bowl-shaped, and in particular, as indicated in FIG. 3, may cross-sectionally have a concave arc-shape or radius that generally conforms to the arc-shape of a caster wheel periphery.

A generally bowl-shaped concave portion beneficially centers a caster front to back and right to left. Furthermore, this shape benefits approach of the caster stop from any direction, and benefits compliance with National Sanitation Foundation standards applicable to commercial kitchens, for radius requirements at intersecting corners of stainless steel fabrications, making it easy for a stainless steel caster stop in accordance with the present invention, to be kept clean.

Advantageously, the concave portion extends upwardly from central portion 22 to a circumferential rim 24. Beneficially, the circumferential rim has a diameter suitably dimensioned to allow a lower periphery 52 of a caster wheel 54 to be in load-bearing contact with concave portion 20, and concave portion 20 has a depth appropriate for facilitating in-and-out movement, yet for providing secure retention, of a caster wheel.

A suitable diameter of circumferential rim 24 and a depth D (shown in FIG. 2) of concave portion 20 are dependent upon considerations including caster wheel diameter. A typical commercial caster wheel has a diameter of about six inches. Thus, for a typical commercial caster wheel, a useful diameter of rim 24 may range from about 3 to 3½ inches, and a depth of about one-half inch of concave portion 20 will be beneficial.

Because a generally bowl-shaped concave portion beneficially centers a caster front to back and right to left, applicability of caster stop 10 is not limited to caster wheels of equal or greater diameter than the diameter of the circumferential rim. On the contrary, a caster wheel may have a diameter less than the diameter of the circumferential rim.

Caster stop 10 further includes a flange 26 that slopes downwardly from circumferential rim 24, and that spans between the circumferential rim and a generally circular foot 30. Beneficially, flange 26 is a gently sloping ramp that facilitates caster wheel movement in and out of concave portion 20, and is generally circular to assist approach of the caster stop from any direction. Although a useful slope for ramp 26 may range from about 30 to 45 degrees, a slope of about 35 degrees is generally beneficial. As shown in FIG. 3, ramp 26 will typically have a rectilinear cross-section.

Ramp 26 extends to generally circular foot 30, which is beneficially adapted for mounting contact with a support surface. Accordingly, foot 30 beneficially is generally planar and has an extent from flange/ramp 26 sufficient to allow secure surface mounting of caster stop 10. As best shown in FIG. 1, foot 30 may be provided with a plurality of spaced apart apertures 32 for anchoring caster stop 10 to a support surface, in combination with anchor bolts 34 (shown in FIG. 3).

In use and with reference to FIGS. 3 and 4 in particular, a pair of caster stops 10 are surface mounted on a support surface (shown in FIG. 3) in an appropriately spaced apart relationship determined by the particular caster-mounted apparatus 50 to be immobilized, and in an appropriate location. Apparatus 50 illustratively has a rear pair 56 of casters, and a front pair of locking casters 58 each provided with a locking mechanism 60. Other caster combinations may also be used; for instance, locking casters may be diagonally spaced apart.

Beneficially, by exerting a force on apparatus 50 and without lifting apparatus 50, wheels 54 of rear pair 56 of casters are rolled onto ramps 26 of the caster stops and into concave portions 20 of the caster stops. Thereafter, the front pair of the casters are locked, thereby immobilizing apparatus 50. Similarly, to move apparatus 50, locking casters 58 are unlocked, and by exerting a pushing force on apparatus 50, caster wheels 54 are rolled out of the caster stops. A like method would be used for immobilizing diagonally spaced apart casters or casters in other relative relationships to one another.

For caster-mounted, commercial cooking equipment, caster stops 10 are beneficially anchored to the floor at the location needed for the rear casters. Advantageously, the inventive caster stops and method ensure that positioning of commercial cooking equipment in compliance with NFPA code is provided for. Furthermore, when made of stainless steel, cleanliness of the caster stops is provided for in compliance with the National Sanitation Foundation standard for radius requirements at intersecting corners, making it easy to keep clean. In addition, surface-mounting allows for inexpensive and convenient retrofit in any existing kitchen facility.

Various modifications and combinations have been described. The present invention may be carried out with other modifications and/or combinations without departing from the spirit or essential attributes thereof. Accordingly, reference should be made to the appended claims as indicating the scope of the invention.

The invention claimed is:

1. A generally circular, surface mountable caster stop comprising a concave portion for receiving a caster wheel, wherein said concave portion comprises a central portion for load-bearing contact with a support surface, and wherein said concave portion extends upwardly to a circumferential rim; and a generally circular flange that slopes downwardly from said circumferential rim and that spans between said circumferential rim and a generally circular foot; wherein the flange is a ramp having a slope that facilitates in-and-out movement of a caster wheel, and said concave portion has a depth appropriate for facilitating said in-and-out movement, yet provides for secure retention, of a caster wheel, wherein said generally circular foot is provided with a plurality of spaced apart apertures.

2. Apparatus mounted on a plurality of casters, and a pair of the caster stops of claim 1 mounted on a support surface, wherein a pair of said plurality of casters is disposed in said pair of mounted caster stops.

3. The apparatus of claim 2, wherein said caster stop is made of metal, and the metal concave portion cross-sectionally has a wheel-centering arc-shape and said central portion is in load-bearing contact with the support surface.

4. The apparatus of claim 2, wherein said apparatus is commercial kitchen equipment.

5. A method of providing for secure placement of equipment mounted on a plurality of casters and, when desired, for displacing said equipment from secure placement, comprising mounting a pair of generally circular caster stops in an appropriately spaced apart relationship on a support surface, wherein each of said caster stops comprises a concave portion for receiving a caster wheel and for load-bearing contact with a support surface, and a generally circular ramp that slopes downwardly from a circumferential rim of said concave portion for facilitating wheel movement in-and-out of said concave portion, and a plurality of spaced apart mounting apertures, wherein said concave portion has a depth appropriate for facilitating said in-and-out movement, yet providing for secure retention; without lifting the caster-mounted equipment, rolling a pair of said plurality of casters of said caster-mounted equipment over said ramps of the mounted caster stops and into said caster stops by exerting a pushing force on said equipment, and when desired, rolling said caster-mounted equipment out of said caster stops by exerting a pushing force on said caster-mounted equipment.

6. The method of claim 5, wherein said plurality of casters of said equipment comprises a front pair of casters and a rear pair of casters, and wherein said rear pair of casters is said pair disposed in said caster stops.

7. The method of claim 5, wherein said equipment is commercial kitchen equipment.

8. The method of claim 5, wherein said caster stop comprises a generally circular foot and is made of stainless steel, and the stainless steel concave portion cross-sectionally has a wheel-centering arc-shape and is in load-bearing contract with the support surface.

9. The method of claim 5, wherein said caster stop is made of metal, and the metal concave portion cross-sectionally has a wheel-centering arc-shape and is in load-bearing contact with the support surface.

10. The method of claim 5, wherein the concave portion depth is about one-half inch.

11. The method of claim 8, wherein said generally circular foot is generally planar.

12. The caster stop of claim 1, wherein said generally circular foot is generally planar and has an extent from said flange sufficient for secure mounting of said caster stop on a support surface.

13. The caster stop of claim 1, wherein said concave portion is generally bowl-shaped.

14. The apparatus of claim 2, wherein said caster stop is made of steel, and the steel central portion is in load-bearing contact with the support surface.

15. The apparatus of claim 2, wherein the concave portion depth is about one-half inch.

* * * * *